(12) United States Patent
Shollenberger

(10) Patent No.: US 10,393,860 B2
(45) Date of Patent: Aug. 27, 2019

(54) MULTI-PLATFORM LOCATION DECEPTION DETECTION SYSTEM

(71) Applicant: GE Aviation Systems LLC, Grand Rapids, MI (US)

(72) Inventor: Dean L. Shollenberger, Ada, MI (US)

(73) Assignee: General Electric Company, Schenectady, NY (US)

( * ) Notice: Subject to any disclaimer, the term of this patent is extended or adjusted under 35 U.S.C. 154(b) by 357 days.

(21) Appl. No.: 15/200,561

(22) Filed: Jul. 1, 2016

(65) Prior Publication Data

US 2018/0003800 A1    Jan. 4, 2018

(51) Int. Cl.
| | |
|---|---|
| G01S 7/36 | (2006.01) |
| G01S 7/02 | (2006.01) |
| G08G 5/00 | (2006.01) |
| G01S 13/72 | (2006.01) |
| H04K 3/00 | (2006.01) |
| G01S 7/38 | (2006.01) |

(52) U.S. Cl.
CPC ............... G01S 7/36 (2013.01); G01S 7/021 (2013.01); G01S 13/72 (2013.01); G08G 5/0082 (2013.01); H04K 3/86 (2013.01); *G01S 7/38* (2013.01); *H04K 3/65* (2013.01)

(58) Field of Classification Search
CPC ......... B66C 23/70; G01S 13/72; G01S 7/021; G01S 7/36; G01S 7/38; G08G 5/0082; H04K 3/65; H04K 3/86; Y10T 29/4978; Y10T 29/49947; Y10T 403/18; Y10T 403/553; Y10T 403/7075
USPC .......................................................... 342/16
See application file for complete search history.

(56) References Cited

U.S. PATENT DOCUMENTS

| | | |
|---|---|---|
| 5,260,820 A | 11/1993 | Bull et al. |
| 6,707,052 B1 | 3/2004 | Wild et al. |
| 8,615,190 B2 | 12/2013 | Lu |
| 2008/0039988 A1* | 2/2008 | Estabrook ............... B64C 13/18 701/14 |
| 2010/0309310 A1* | 12/2010 | Albright .............. G08G 5/0082 348/135 |
| 2013/0229298 A1* | 9/2013 | Eckstein ............... G01S 13/726 342/107 |

(Continued)

OTHER PUBLICATIONS

Jian-Xun, L., et al., "Signal Feature Analysis and Experimental Verification of Radar Deception Jamming," IEE CIE International Conference on Radar, pp. 230-233 (2011).

(Continued)

*Primary Examiner* — Timothy X Pham
(74) *Attorney, Agent, or Firm* — Dority & Manning, P.A.

(57) ABSTRACT

Systems and methods for identifying a synthetic track are provided. In one embodiment, a method can include receiving, by one or more computing devices, a plurality of emissions from one or more platforms. The emissions can be generated in an emission sequence and are generated to create a track indicative of an object travel path. The method can further include determining, by the one or more computing devices, whether an irregularity associated with the track exists based at least in part on one or more of the emissions. The method can include rejecting, by the one or more computing devices, the track as an actual object travel path when it is determined that the irregularity associated with the track exists.

14 Claims, 9 Drawing Sheets

(56) References Cited

U.S. PATENT DOCUMENTS

2014/0063243 A1* 3/2014 Giuffrida .............. G01C 11/02
                                                                348/144
2016/0134378 A1* 5/2016 Young ................. H04B 14/008
                                                                342/361
2018/0006760 A1   1/2018 Shollenberger

OTHER PUBLICATIONS

Li, X. R., et al., "Tracking in the Presence of Range Detection ECM and Clutter by Decomposition Jamming," Proceedings of the SPIE, vol. 3809, pp. 198-210 (Oct. 1999).

Purvis, K. B., et al., "Estimation and Optimal Configurations for Localization Using Cooperative UAV s," IEEE Transactions on control systems technology, vol. 16, No. 5, pp. 947-958 (Sep. 2008).

Rao, B., et al., "Maximum Likelihood Approach to the Estimation and Discrimination of Exoatmospheric Active Phantom Tracks using Motion Features," IEEE Transactions On Aerospace and Electronic Systems, vol. 48, No. 1, pp. 794-819 (Jan. 2012).

Xu, Y., et al., "Virtual motion camouflage based phantom track generation through cooperative electronic combat air vehicles," Automatica, vol. 46, pp. 1454-1461 (2010).

Zhao, S., et al., "Discrimination of Deception Targets in Multistatic Radar Based on Clustering Analysis," IEEE Sensors Journal, vol. 16, No. 8, pp. 2500-2508 (Apr. 15, 2016).

Zhao, Y., et al., "Tracking Technique for Radar Networks in the Presence of Multi-Range-False-Target Deception Jamming," Acta Electronica Sinica, vol. 35, No. 3, pp. 454-458 (Mar. 2007) (Abstract).

Extended European Search Report and Opinion issued in connection with corresponding EP Application No. 17179005.8 dated Nov. 22, 2017.

* cited by examiner

MULTI-PLATFORM LOCATION DECEPTION DETECTION SYSTEM

FIELD OF THE INVENTION

The present subject matter relates generally to providing location deception and more particularly to providing angular location deception using a plurality of platforms.

BACKGROUND OF THE INVENTION

Deception techniques can be used to mislead an adverse observer as to the location of a vehicle. For instance, an aircraft can create deception as to the distance and/or speed of the aircraft, thereby misleading the observer as to the actual location of the aircraft. However, the observers can overcome such deception by deploying multiple observation angles to determine the actual aircraft position based on line-of-sight of each observation angle to the aircraft.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a computer-implemented method of identifying a synthetic track. The method can include receiving, by one or more computing devices, a plurality of emissions from one or more platforms. The emissions can be generated in an emission sequence and can be generated to create a track indicative of an object travel path. The method can further include determining, by the one or more computing devices, whether an irregularity associated with the track exists based at least in part on one or more of the emissions. The method can include rejecting, by the one or more computing devices, the track as an actual object travel path when it is determined that the irregularity associated with the track exists.

Another example aspect of the present disclosure is directed to a computing system for identifying a synthetic track. The system can include one or more processors and one or more memory devices. The one or more memory devices can store instructions that when executed by the one or more processors cause the one or more processors to receive a plurality of emissions from a plurality of platforms, wherein the plurality of emissions are generated to create a track. The track aims to create an object travel path, and wherein a first angle associated with the track is different than a plurality of second angles associated with the travel paths of the plurality of aerial platforms. The processors can be further caused to determine whether an irregularity associated with the track exists based at least in part on one or more of the emissions. The processors can be caused to reject the track as an actual object travel path when it is determined that the irregularity associated with the track exists.

Yet another example aspect of the present disclosure is directed to an observational device for identifying a synthetic track. The observation device can include one or more processors and one or more memory devices. The one or more memory devices can store instructions that when executed by the one or more processors cause the one or more processors to receive a plurality of emissions from a plurality of platforms. The plurality of emissions can be generated to create a track. The track can aim to create an object travel path that is observable by the observation device. The track can include one or more bearing angles that create angular deception intending to mislead as to travel paths of the one or more platforms. The processors can be further caused to determine whether an irregularity associated with the track exists based at least in part on one or more of the emissions. The processors can be caused to reject the track as an actual object travel path when it is determined that the irregularity associated with the track exists.

Other example aspects of the present disclosure are directed to systems, methods, aircrafts, avionics systems, devices and non-transitory computer-readable media for providing a synthetic track to one or more observation devices as well as observation devices for identifying synthetic tracks.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
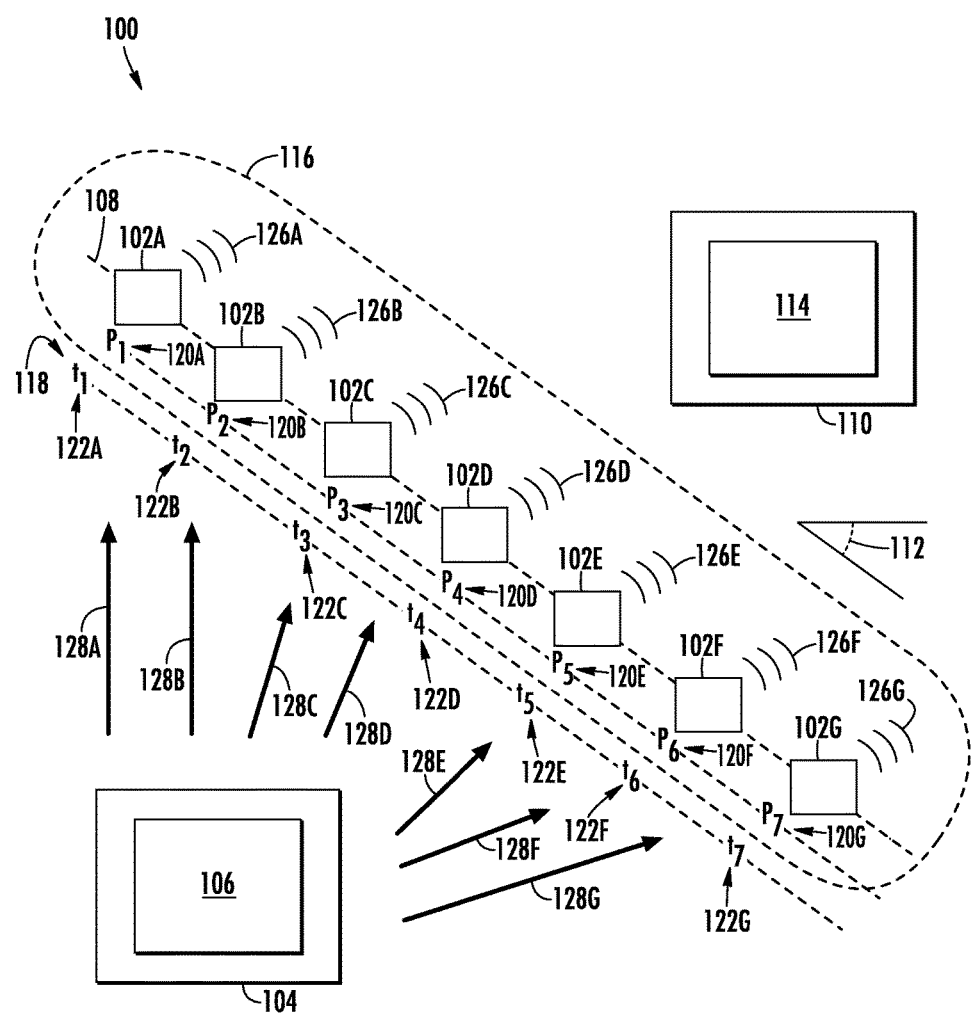
FIG. 1 depicts an example system according to example embodiments of the present disclosure.

Reference now will be made in detail to embodiments of the present disclosure, one or more example(s) of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of one embodiment or implementation can be used with another embodiment or implementation to yield a still further embodiment. Thus, it is intended that the present disclosure covers such modifications and variations as come within the scope of the appended claims and their equivalents.

Example aspects of the present disclosure are directed to systems and methods for providing a synthetic track to one or more observation devices. For instance, a computing system (e.g., associated with an operations/command center) can coordinate a plurality of platforms to generate a sequence of either responsive or non-responsive emissions to project a synthetic track. The platforms can include, for instance, multi-function emitter platforms, UAVs, aerial platforms, water platforms, platforms capable of traveling/operating underwater, platforms capable of operating in outer space, etc. The synthetic track can be a false object travel path and/or implied vehicle path (or paths) that can be observable by the one or more observation device(s) (e.g., radar devices of an adverse entity). Moreover, the orientation of the synthetic track can be different from the actual travel paths of the platforms. The synthetic, of false, track intentionally may be designed to not correspond with the physical motion of any platforms. The synthetic track can create angular deception to mislead the observation devices as to the actual travel paths and/or locations of the platforms. To do so, for example, the synthetic track can be associated with a bearing angle that is different than the travel paths of the platforms.

The computing system can determine a location and/or time range in which to create such a synthetic track. Based, at least in part, on the prescribed location and/or time range the computing system can determine a sequence of location and time pairings for each platform of the plurality of platforms (e.g., a swarm of aerial platforms) to generate an emission. The computing system can send data indicative of the emission times and/or locations to the platforms such that the platforms can generate the emissions in a sequence to create the synthetic track within the location range and/or the time range. In this way, the sequence of emissions (or delayed versions of existing radar or communications signals) from the various platforms can create one of more false targets which appear to move in space. Any single emission will appear along the radial between the platform and any particular observer, but subsequent emissions move to a new radial creating apparent bearing change and angular deception.

More particularly, the computing system can identify a travel path for each platform of the plurality of platforms. This can be done while one or more of the platforms are deployed (e.g., a swarm of airborne platforms) and/or before one or more of the platforms are deployed. In some implementations, one or more of the platform(s) can be associated with one or more static travel path(s), such that the respective platform remains generally at a single location. In such a case, the stationary platforms can exist along a line and sequential emissions can create the appearance of motion, as further described herein. In some implementations, one or more of the platform(s) can be associated with one or more non-static travel path(s), such that the platform(s) can travel in space, for example, in a parallel and/or arbitrary manner relative to one another.

The computing system can determine a location range and/or a time range for a synthetic track to be created by the plurality of platforms. In some implementations, this determination can be based, at least in part, on the travel path for each platform. For example, a very large number of platforms can be deployed within minimal constraints on four dimensional locations. The computing system can dynamically select/prescribe the actions of the platforms (e.g., generating emissions to create a synthetic track) based, at least in part, on the travel paths of the platforms. Additionally, and/or alternatively, the location range and/or the time range can be based, at least in part, on the position, type, orientation, etc. of the one or more observation device(s).

The computing system can determine an emission location and/or an emission time for each of the plurality of platforms based, at least in part, on the location range and/or the time range. The emission location can be indicative of a location at which the respective platform is to generate an emission. The emission time can be indicative of a time at which the respective platform is to generate the emission. The emission locations and/or emission times can be selected to create the appearance of motion along a synthetic track. The apparent speed (of the "false" target moving along the synthetic track) can be selected by the ratio of the physical spacing between platforms and/or emissions divided by the time between emissions.

The computing system can send a set of data to each of the plurality of platforms. Each respective set of data can indicate the emission location and/or the emission time at which the respective platform is to generate the emission to create the synthetic track. In this way, the computing device(s) can coordinate the platforms such that they are to generate the emissions in a sequence based, at least in part, on the emission locations and/or the emission times to create the synthetic track within the desired location range and/or the time range. The platforms can receive the sets of data and generate the emissions, at the emission times and/or locations, to create the synthetic track. To the observation device(s), the observed synthetic track(s) can match and would be consistent with TDOA (time difference of arrival) techniques.

The emissions can be non-responsive or responsive. For example, the platforms can generate the emissions not in response to signals from the observation devices. In some implementations, as further described herein, the platforms can generate the emissions in response to receiving signals from the observation devices. In such a case, the platforms can utilize unique Doppler correction (and/or Doppler dilution), if desired, in the event that the platform paths are not at a desired location, have non-parallel paths, are not of the same speed, etc.

Additionally, and/or alternatively, the plurality of platforms can represent a swarm of platforms that can be used in any of the systems and/or methods described herein. For instance, the platforms can be deployed within minimal constraints on four dimensional locations. The computing system can dynamically select emission locations and/or times based, at least in part, on the travel paths of the platforms. In the case of non-responsive emissions (as further described herein), this can allow for more frequent updates consistent with one or more desired synthetic tracks. For the responsive emissions (as further described herein), particularly within systems which utilize "random" search actions, this added flexibility can greatly reduce the chances of not having a platform in an appropriate four-dimensional position consistent with the desired synthetic track. In addition to potentially maintaining multiple synthetic tracks, the swarm could also provide synthetic tracks using the techniques described herein. Further, the swarm approach can make it feasible to support consistent responsive synthetic tracks for multiple observation device(s) operating diversely, as well as refine estimation of parameters associated with observation device(s) (e.g., beam-width) by the platforms.

Additional aspects of the present disclosure are directed to systems and methods for identifying a synthetic track. For instance, the observation device(s) can examine the emissions from the platforms to determine whether or not to accept the synthetic track as a possible motion path of an object. As further described herein, the observation device(s) can determine whether an irregularity associated with the synthetic track exists such that it would be unrealistic for the synthetic track to be associated with an actual object in motion. The observation device(s) can then accept and/or reject the synthetic track based, at least in part, on the existence of an irregularity.

The systems and methods according to example aspects of the present disclosure provide effective location detection techniques. More particularly, by utilizing a plurality of platforms, the systems and methods can provide synthetic tracks that include one or more bearing angles that create angular deception intending to mislead an observation device as to the actual locations and/or travel paths of the platforms. This can lead to confidence weakening of adverse observation devices. Moreover, the system and methods enable the platforms to create such deception even if the platform is positioned away from a desired location. In this way, the systems and methods according to example aspects of the present disclosure have a technical effect of creating false synthetic tracks with significant cross range motion which can introduce time-criticality to further support early warning and/or asset/area defense.

Moreover, the systems and methods according to example aspects of the present disclosure provide effective techniques for identifying potential location deception. More particularly, by examining the emissions of the plurality of platforms, an observation device can identify whether the platforms aim to create a false object travel path to deceive the observation device. This can allow an observation device to disregard false tracks and to allocate its resources to following physical targets-of-interest. In this way, the systems and methods according to example aspects of the present disclosure have a technical effect of identifying false synthetic tracks to preserve computational resources for the monitor of a real physical target, while increasing the effectiveness of actual hostile platform detection.

FIG. 1 depicts an example system 100 according to example embodiments of the present disclosure. As shown the system 100 can include a plurality of platforms 102A-G and a computing system 104. As further described herein, the platforms 102A-G and the computing system 104 can be configured to communicate with one another (e.g., to send and/or receive data).

The platforms 102A-G can include a multi-function emitter platform, a remotely operated platform (ROAP), an unmanned vehicle (UAV), a helicopter, a drone, other aircraft, a watercraft, a vehicle capable of operating underwater, underwater platform, and/or any other device capable of sufficient maneuverability for the operations described herein. Each platform 102A-G of the plurality of platforms 102A-G can be physically separated from each of the other platforms 102A-G of the plurality of platforms 102A-G. For instance, in some implementations, no wires and/or other components need be configured to physically couple the plurality of platforms 102A-G to one another. Each of the platforms 102A-G can include one or more computing device(s). The computing device(s) can include various components for performing various operations and functions. For example, the computing device(s) can include one or more processor(s) and one or more memory device(s). The one or more memory device(s) can store instructions that when executed by the one or more processor(s) cause the one or more processor(s) to perform the operations and functions for providing a synthetic track, as described herein.

The computing system 104 can be associated with an entity that maintains, controls, monitors, and/or is otherwise associated with the operation of the platforms 102A-G. For instance, the computing system 104 can be associated with an operations and/or command center for the platforms 102A-G (e.g., a ground-based center, airborne control node, other control node). The computing system 104 can include one or more computing device(s) 106. The computing device(s) 106 can include various components for performing various operations and functions. For example, and as further described herein, the computing device(s) 106 can include one or more processor(s) and one or more memory device(s). The one or more memory device(s) can store instructions that when executed by the one or more processor(s) cause the one or more processor(s) to perform the operations and functions, as described herein.

The computing device(s) 106 can be configured to coordinate the creation of a synthetic track 108, by at least some of the platforms 102A-G, that can be observed by one or more observation device(s) 110. The synthetic track 108 can be a false object travel path and/or a realistic implied vehicle path (or paths) that can be observable by the one or more observation device(s) 110. The synthetic track 108 can create an angular deception to mislead the observation device(s) 110 as to the actual location of one or more of the platforms 102A-G. For instance, a first angle 112 associated with the synthetic track 108 can be different than a plurality of second angles associated with the travel paths of the plurality of platforms 102A-G, as further described herein.

The observation device(s) 110 can include a radar device, tracking device, monitoring device, anti-aircraft device, water associated device, etc. associated with an entity that the operators/controllers of the platforms 102A-G desire to mislead as to the location and/or travel paths of the platforms 102A-G. For example, the observation device(s) 110 can be associated with an adverse and/or hostile entity/party. In another example, the observation device(s) 110 can be associated with an entity/party (e.g., non-hostile) that does not have permission, clearance, a need-to-know, etc. to know and/or identify the location and/or travel paths of the platforms 102A-G. The observation device(s) 110 can include one or more computing device(s) 114. The computing device(s) 114 can include various components for performing various operations and functions, such as recognizing a synthetic track as further described herein.

Figure 2:
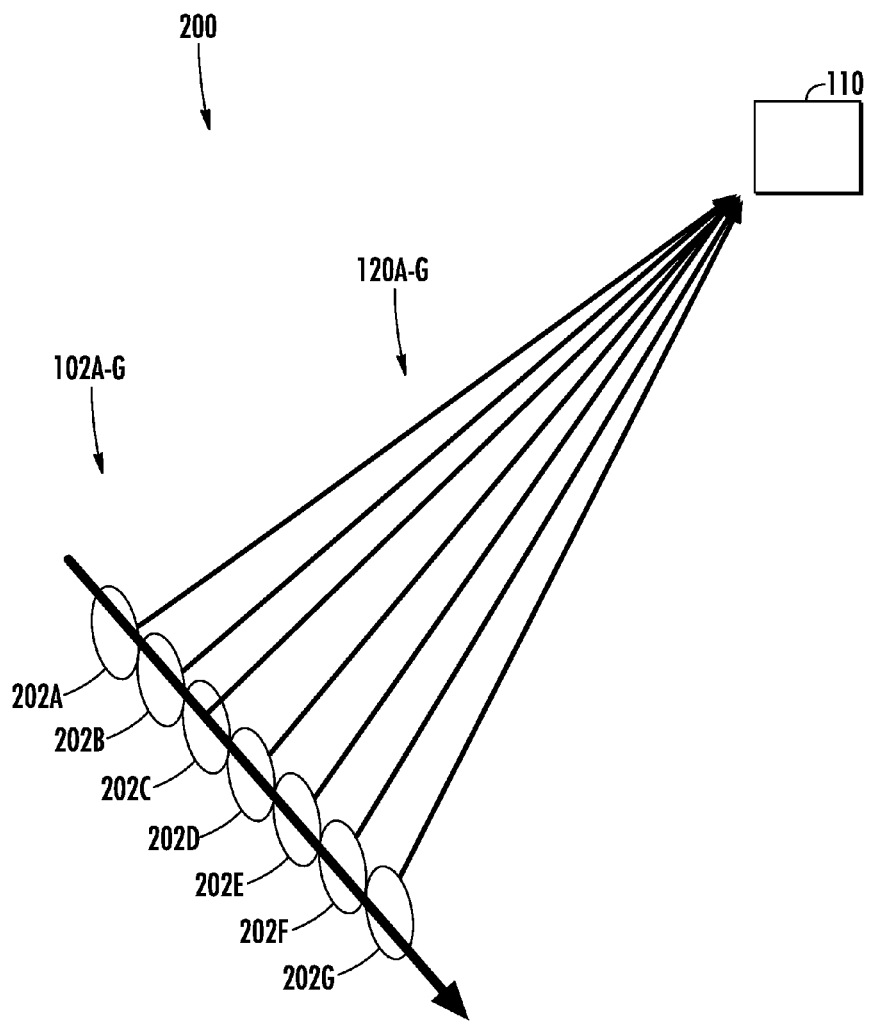
FIG. 2 depicts an example orientation of a plurality of platforms according to example embodiments of the present disclosure.

The computing device(s) 106 can be configured to identify a travel path for each platform 102A-G of the plurality of platforms 102A-G. A travel path can be a flight path of an aerial platform, a travel path of a watercraft platform, a travel path of an underwater platform, a travel path of another platform type, etc. In some implementations, one or more of the platforms 102A-G of the plurality of platforms 102A-G can be associated with a travel path such that the respective platform 102A-G remains generally at a single location. For instance, FIG. 2 depicts an example orientation 200 of the plurality of platforms 102A-G. As shown in FIG. 2, the travel paths 202A-G of each of the platforms 102A-G can be static, such that the respective platform 102A-G remains generally at a single location in space.

Figure 3:
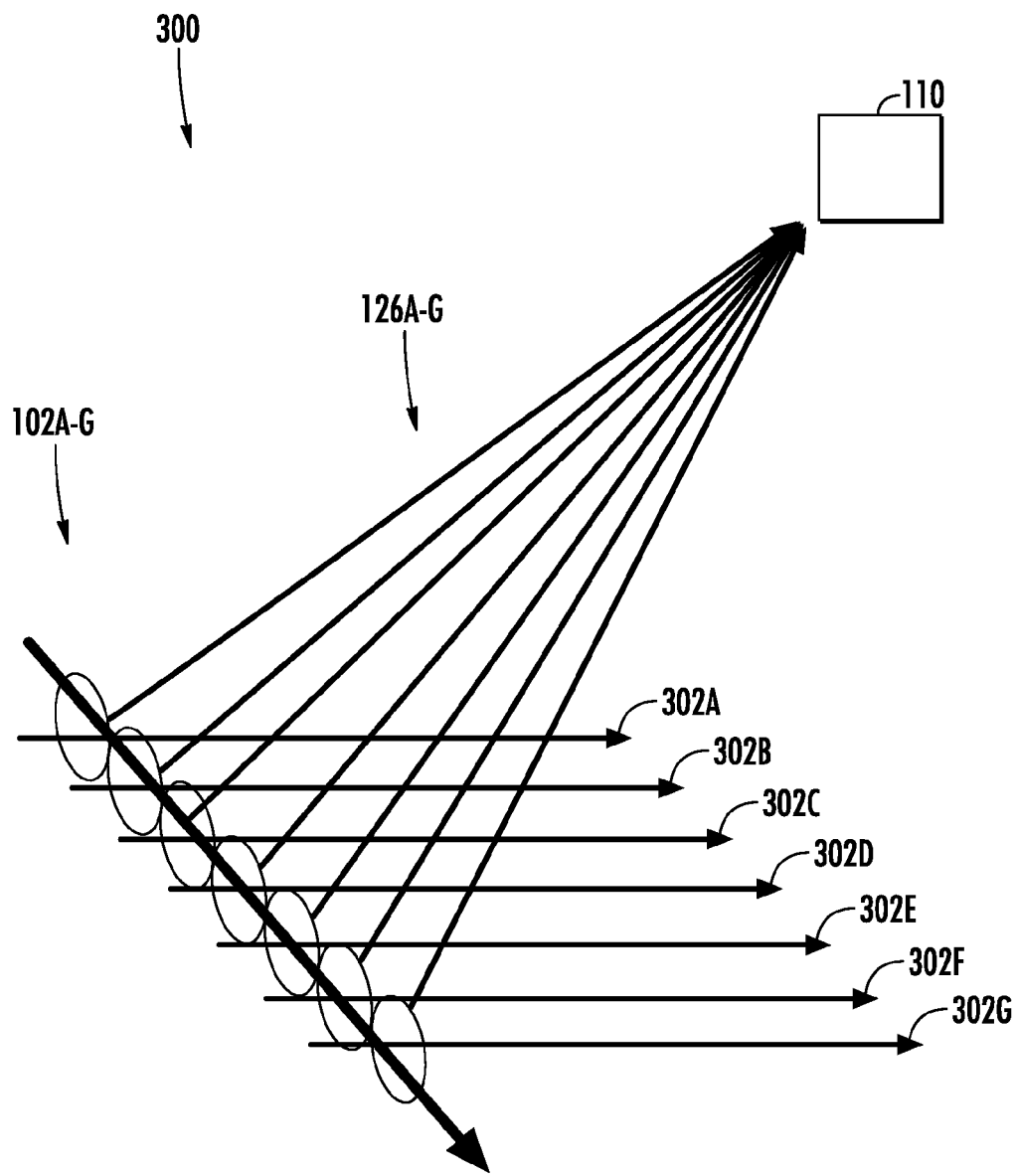
FIG. 3 depicts an example orientation of a plurality of platforms according to example embodiments of the present disclosure.

In some implementations, one or more of the platforms 102A-G can be associated with a non-static flight plan, such that the respective platform 102A-G travels from more than one location. For instance, FIG. 3 depicts an example orientation 300 of the plurality of platforms 102A-G. As shown in FIG. 3, one or more platform 102A-G of the plurality of platforms 102A-G can be associated with a travel path 302A-G that includes a segment that is in a generally parallel direction relative to one or more travel paths of one or more other platforms 102A-G of the plurality of platforms 102A-G.

Figure 4:
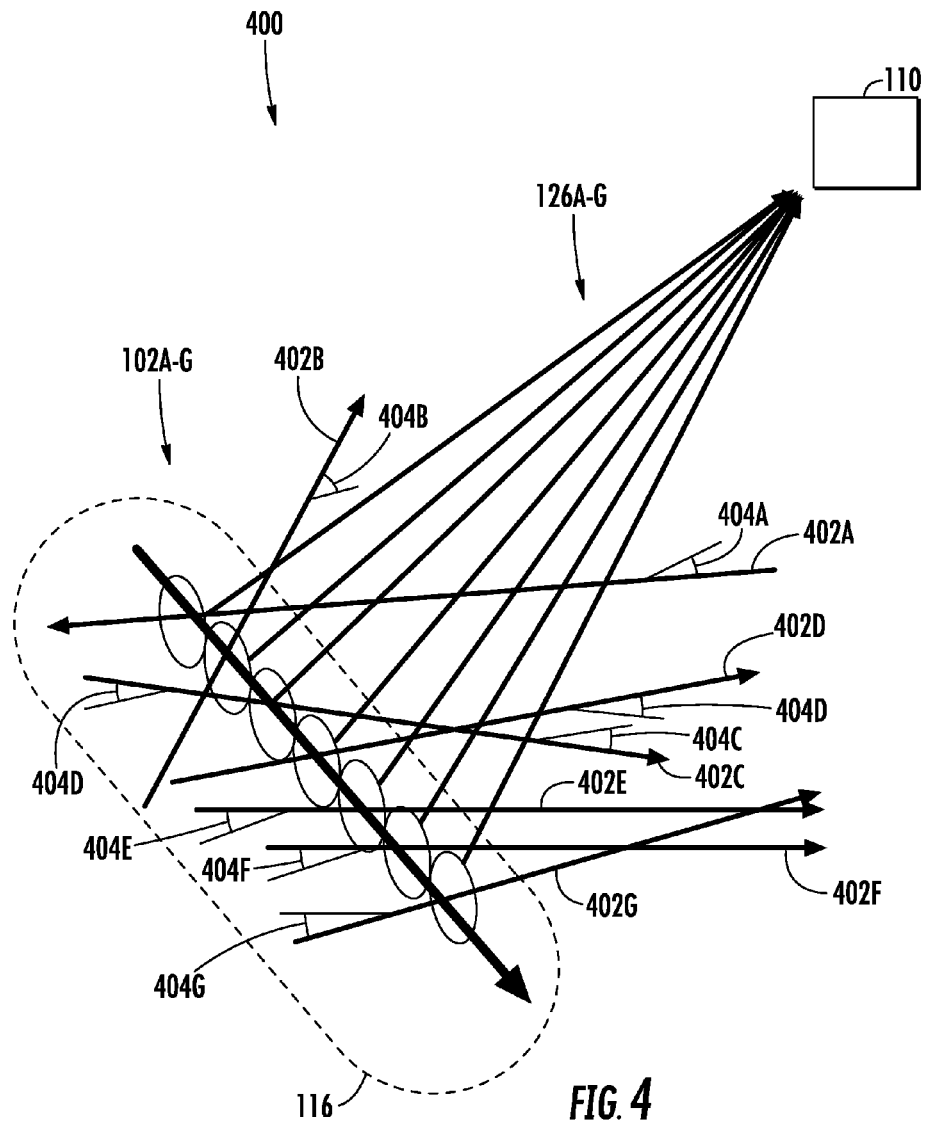
FIG. 4 depicts an example orientation of a plurality of platforms according to example embodiments of the present disclosure.

In some implementations, one or more of the platforms 102 can be associated with an arbitrary travel path, such that the respective platform 102A-G travels from more than one location in an arbitrary direction relative to the other platforms. For instance, FIG. 4 depicts an example orientation 400 of the plurality of platforms 102A-G. As shown in FIG. 4, one or more platform 102A-G of the plurality of platforms 102A-G can be associated with a travel path 402A-G that includes a segment that is in a generally arbitrary direction relative to one or more travel paths of one or more other platforms 102A-G of the plurality of platforms 102A-G.

Returning to FIG. 1, the computing device(s) 106 can be configured to determine a location range 116 and/or a time range 118 for the synthetic track 108 to be created by the plurality of platforms 102A-G based, at least in part, on the travel path (e.g., 202A-G, 302A-G, 402A-G) for each platform. For instance, the computing device(s) 106 can be configured to determine that it would like to create (e.g. create the appearance of) the synthetic track 108 within the location range 116. Additionally, and/or alternatively, the computing device(s) 106 can be configured to determine that it would like to create (e.g. create the appearance of) the synthetic track 108 within the time range 118. Such determinations can be based, at least in part, for example, on the presence and/or location of the observation device(s) 110, a particular objective, etc. The computing device(s) 106 can examine the respective travel paths (e.g., 402A-G) of each of the platforms 102A-G and determine when and where each of the platforms 102A-G will be and at which point(s) in the travel paths (e.g., 402A-G) the platforms 102A-G should generate an emission such that the synthetic track 108 appears within the location range 116 and/or the time range 118. In some implementations, the computing device(s) 106 can determine the location range 116 and/or the time range 118 for the synthetic track 108 and send a command signal and/or travel path to the platforms 102A-G such that the platforms 102A-G are properly positioned to create (e.g. create the appearance of) the synthetic track 108 within the location range 116 and/or the time range 118.

The computing device(s) 106 can determine an emission location 120A-G and/or an emission time 122A-G for each platform 102A-G of the plurality of platforms 102A-G based, at least in part, on the location range 116 and/or the time range 118. The emission location can be indicative of a location (e.g., $p_1 \ldots p_7 \ldots p_n$) at which the respective platform 102A-G is to generate an emission 126A-G. The emission time 122A-G can be indicative of a time (e.g., $t_1 \ldots t_7 \ldots t_n$) at which the respective platform 102A-G is to generate an emission 126A-G. By way of example, in order to create the synthetic track 108 within the location range 116 and/or the time range 118 the computing device(s) 106 can determine that a first platform 102A should generate an emission 126A at the emission location 120A and the emission time 122A. The emission location 120A and the emission time 122A can be identified such that the emission 126A is generated to create at least a portion of the synthetic track 108 within the location range 116A and the time range 122A. This process can be repeated for each of the platforms 102A-G. The emission times 122A-G, for each of the platforms 102A-G, can be separated by fixed time intervals. This can allow the synthetic track 108 to appear more realistic (e.g., similar to a real vehicle travel path) to the observation device(s) 110.

The computing device(s) 106 can be configured to coordinate the creation of the synthetic track 108 by, for instance, sending a set of data 128A-G to each of the plurality of platforms 102A-G. Each respective set of data 128A-G can indicate the emission location 120A-G and/or the emission time 122A-G at which the respective platform 102A-G is to generate an emission 126A-G to create (at least a portion of) the synthetic track 108. By way of example, the set of data 128A can indicate the emission location 120A (e.g., $p_1$) and/or the emission time 122A (e.g., $t_1$) at which the respective platform 120A is to generate the emission 126A, to create (at least a portion of) the synthetic track 108.

In some implementations, the set of data 128A can include only the emission time 122A-G. For instance, each emission time 122A-G can be associated with a location in the travel path (e.g., 402A) of the respective platform (e.g., 102A) such that the emissions are generated within the location range 116. By way of example, in the event that the platform 102A is configured to travel (or is travelling) according to a set travel plan and/or travel path (e.g., 402A), the platform 102A may only need to know when to generate the emission 126A as the location of the platform 102A can be pre-determined for each time along the travel path 402A.

Each platform 102A-G of the plurality of platforms 102A-G can be configured to receive a set of data 128A-G indicating an emission location 120A-G and/or an emission time 122A-G at which the platform 102A-G is to generate an emission 126A-G. In some implementations, the platforms 102A-G can receive the set of data 128A-G when one or more (or each) platform 102A-G of the plurality of platforms 102A-G is deployed (e.g., travelling, airborne, underwater). In some implementations, the set of data 128A-G can be received by the platforms 102A-G before one or more (or each) of the platforms 102A-G are deployed. In this way, the computing device(s) 106 can pre-program the platforms 102A-G to create the synthetic track 108 within the location and/or time ranges 116, 118.

Each platforms 102A-G can be configured to generate an emission 126A-G at the emission location 120A-G and/or emission time 122A-G (e.g., indicated in the set of data 128A-G) such that at least a portion of the synthetic track 108 is created by the emissions 126A-G of the platform 102A-G within the location range 116 and/or time range 118. The emissions 126A-G can include a radio-frequency (RF) emission, a light emission, a sonar emission, and/or other types of emissions that can be observed and/or detected by the observation device(s) 110. Each emission 126A-G can be similar to the other emissions such that they appear, to the observation device(s) 110, to be generated by the same source. In some implementations, the emissions 126A-G can be separated by fixed time intervals. In this way, it can appear, to the observation devices 110, as if a platform is moving in the direction of the synthetic track 108, when in fact, no such platform exits.

Additionally, and/or alternatively, the emissions 126A-G can vary in reflectivity and/or emissivity from one another. By way of example, the set of data 128A-G can be indicative of a reflectivity and/or emissivity associated at which a respective emission 126A-G is to be generated by the platform 102A-G. Each platform 102A-G can generate its respective emission based, at least in part, on the reflectivity and/or emissivity indicated in the set of data 128A-G. The reflectivity and/or emissivity associated with emission of a platform can be different than one or more reflectivity and/or emissivity associated with the emissions of other platforms. In this way, a location/time sequence of varying reflectivity and/or emissivity can be employed to provide further deception of the observation device(s) 110.

The plurality of platforms 102A-G can generate the emissions 126A-G in a sequence based, at least in part, on the emission locations 120A-G and/or emission times 122A-G to create the synthetic track 108. By way of example, a first platform 102A can be configured to generate a first emission 126A at a first emission location 120A (e.g., $p_1$) and/or at a first emission time 122B (e.g., $t_1$). The first emission 126A can be the first emission in the sequence. A second platform 102B can be configured to generate a second emission 126B at a second emission location 120B (e.g., $p_2$) and/or at a second emission time 122A (e.g., $t_2$). The second emission 126B can occur after the first emission 126A. A third platform 102C can be configured to generate a third emission 126C at a third emission location 120C (e.g., $p_3$) and/or at a third emission time 122C (e.g., $t_3$). The third emission 126C can occur after the second emission 126B. A fourth platform 102D can be configured to generate a fourth emission 126D at a fourth emission location 120D (e.g., $p_4$) and/or at a fourth emission time 122D (e.g., $t_4$). The fourth emission 126D can occur after the third emission 126C. This process can continue in a similar manner with a fifth platform 102E and sixth platform 102F. A seventh platform 102G can be configured to generate a seventh emission 126G at a seventh emission location 120G (e.g., $p_7$) and/or at a seventh emission time 122G (e.g., $t_7$). The seventh emission 126G can represent the last emission in the sequence although the present disclosure can include more or less numbers of emissions and/or platforms without deviating from the scope of the present disclosure. In this way, the first through seventh emissions 126A-G can be generated in the above-described sequence such that it appears that an platform is traveling along the synthetic track 108 and making periodic emissions. As shown, for example in FIG. 4, the synthetic track 108 created by the emissions 126A-G can be associated with a first angle 112 that is different than a plurality of second angles 404A-G associated with one or more travel paths 402A-B of the plurality of platforms 102A-G. In this way, the platforms 102A-G can be configured to create angular deception to mislead the observation device(s) 110 to determine that a false platform is traveling in a direction and/or angle that is different than the platforms 102A-G.

For example, to multiple observation device(s) 110, the observed synthetic track 108 could match and be consistent with TDOA (time difference of arrival) data, if available. Depending on the types of sensors and systems merging data, some matches and/or mismatches can be created in an effort to exploit specific logic. For example, observation device(s) 110 with matching synthetic tracks and TDOA data would find that frequency difference of arrival (FDOA) does not match the synthetic track 108 (unless emission frequencies were tailored as a function of angle, and would only work with good sidelobes or noise cover). This can arise because spatially separated FDOA receivers can observe differing Doppler shifts depending on the relative orientation to the apparent synthetic track 108. Moreover, the synthetic track 108 can create a mismatch from FDOA data because the synthetic track Doppler does not have the correct variation as a function angle from the synthetic track 108. The FDOA mismatch may be a positive or negative feature, depending on the victim systems and desired effect. In some implementations, creating conflicts in observation device(s) 110 may be sufficient to deceive the observation device(s) 110 or proper correlation among multiple observers. For example, if the platforms 120A-G are associated with arbitrary travel paths, they can still maintain a synthetic track aligned with TDOA and introduce substantial randomness into FDOA; if the FDOA confidence breaks down, there may be restored (false) confidence in the false arbitrarily synthetic (and TDOA) track.

Similarly, a burst of emissions 126A-G from each platform 102A-G can appear to create a series of false targets along the instantaneous radial from the platforms 102A-G to observation device(s) 110. The apparent formation orientation can differ between observation device(s) 110 and the formation orientation can rotate over time. Accordingly, the observation device(s) 110 can be misled as to the actual locations and/or travel paths of the platforms 102A-G.

In some implementations, the emissions 126A-G can be generated not in response to one or more signal(s) from one or more observation device(s) 110. For example, FIGS. 2-5 depict example implementations in which the emissions 126A-G are not generated in response to the plurality of platforms 102A-G receiving one or more signal(s) from one or more observation device(s) 110.

Figure 5:
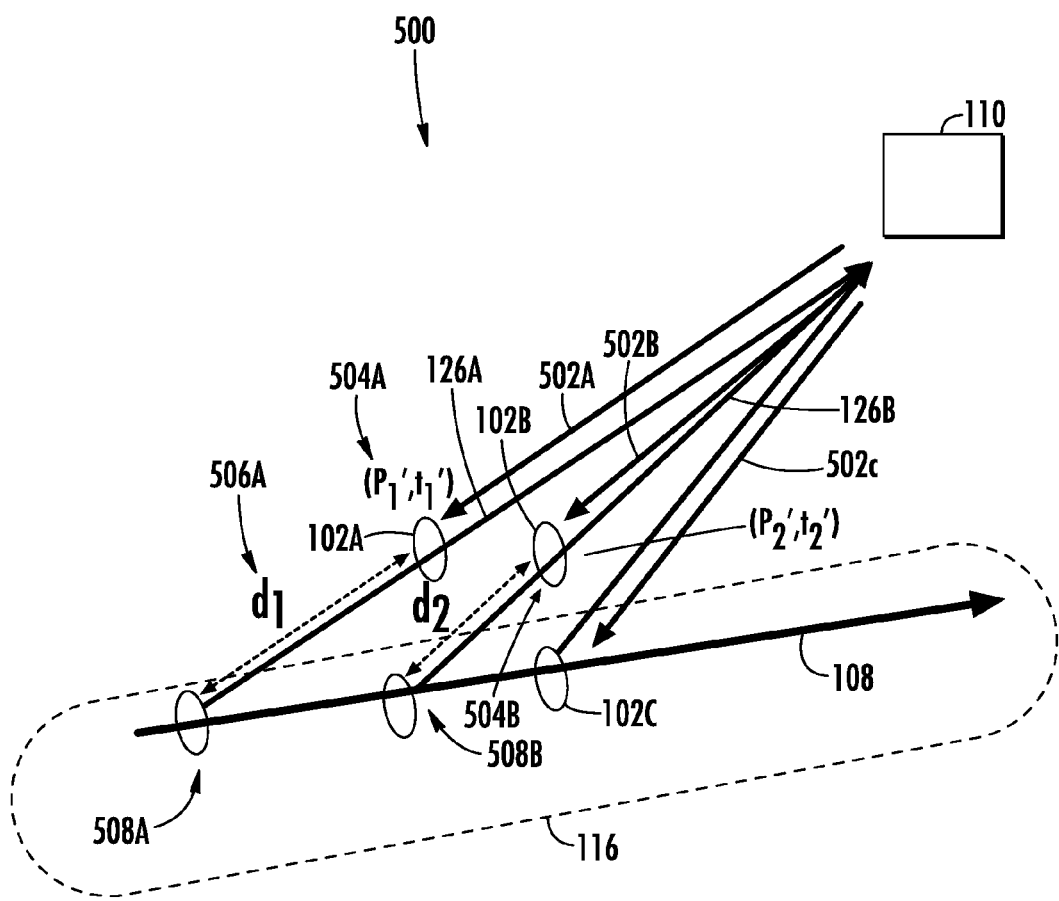
FIG. 5 depicts an example orientation of a plurality of platforms according to example embodiments of the present disclosure.

In some implementations, one or more of the emissions 126A-G can be generated by one or more of the platform(s) 126A-G in response to one or more of the platforms 102A-G receiving one or more signal(s) from one or more observation device(s) 110. For instance, FIG. 5 depicts an example orientation 500 of the plurality of platforms 102A-C. The computing device(s) 114 (of the observation device(s) 110) can send one or more signals(s) 502A-C to the platforms 102A-G. The platform(s) 102A-C can receive one or more signal(s) 502A-C from the observation device(s) 110. The signal(s) 502A-C can be encoded to induce a response from the platform(s) 102A-C to facilitate the monitoring of such platforms.

As shown in FIG. 5, one or more of the platform(s) 102A-C can be located at a position other than the emission location determined by the computing device(s) 106. For instance, the first platform 102A can be located at a position 502A (e.g., $p_1'$) when it receives a first signal 502A (e.g., at a time $t_1'$). If the first platform 102A responded immediately following receipt of the signal 502A (e.g., with the first platform 102A at a position $p_1'$, at a time $t_1'$) then the sequence of emissions may create a synthetic track that does not appear like that of real platform. This can lead to a risk of the observation device(s) 110 rejecting the synthetic track.

To address this, one or more of the platforms 102A-C can be configured to determine a time delay and adjust its emission time such that the emissions appear to be generated within the location range 116 (at an appropriate time), in accordance with the planned sequence. For instance, the first platform 102A can be configured to receive the first signal 502A from the one or more observation device(s) 110. The first platform 102A can be configured to determine a time delay 506A (e.g., $d_1$) based, at least in part, on the signal 502A received from the one or more observation device(s) 110. For instance, the time delay 506A (e.g., $d_1$) can include the time necessary for the first emission 126A to appear as if it was generated from a position (e.g., $p_1$) within the location range 116. The first platform 102A can adjust its emission time based, at least in part, on the time delay 506A (e.g., $d_1$), such that the first emission 126A can be generated at the adjusted emission time 508A to create at least the portion of a synthetic track 108 (to appear) within the location range 116. In some implementations, the first platform 102A and/or the computing device(s) 106 can communicate with the second platform 102B, third platform 102C, etc. to inform the other platforms of the delay in one or more of the emissions, so that the other emission locations and/or times can be generated to create a synthetic track that will not be rejected by the observation device(s) 110.

Figure 6:
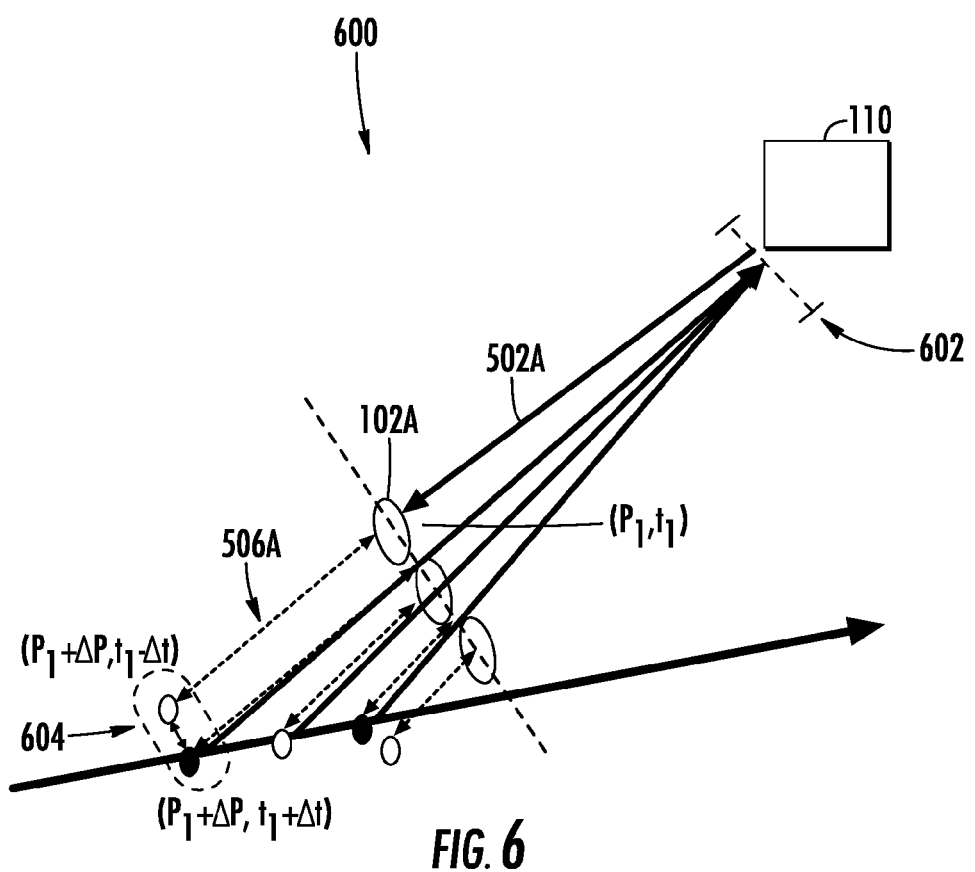
FIG. 6 depicts an example orientation of a plurality of platforms according to example embodiments of the present disclosure.

In some implementations, the time delay 506A can be indicative of a range at which the emission 126A can be generated. For instance, FIG. 6 depicts an example orientation 600 of the plurality of platforms 102A-C. The first platform 102A can be configured to receive the first signal 502A from the one or more observation device(s) 110. The first platform 102A can estimate an observational error 602 associated with the one or more observation device(s) 110 based, at least in part, on the signal 502A received from the one or more observation device(s) 110. For example, the first platform 102A can determine the observational error 602 based, at least in part, on the transmitting power, the wavelength, the beam width, other characteristics, etc. associated with the signal 502A.

The first platform 102A can be configured to determine the time delay 506A based, at least in part, on the observational error 602. The time delay 506A can be indicative of a range 604 at which the emission 126A can be generated. The range 604 can include an emission location range (e.g., $p_1-\Delta p \ldots p_1+\Delta p$) and/or an emission time range (e.g., $t_1-\Delta t \ldots t_1+\Delta t$) in which the first platform 102A can generate the emission 126A such that, at least a portion of, the synthetic track 108 will not be rejected by the observation device(s) 110. For instance, because there is observational error (e.g., 602) associated with observation device(s) 110 it is possible that the synthetic track 108 does not have to be perfectly straight and/or include emissions 126A-G within perfectly segmented intervals. Rather, the first platform 102A can have a degree of freedom as to when and/or where it creates the first emission 126A in response to the first signal 502A, such that the synthetic track 108 will still be accepted by the observation device(s) 110. The range 604 can be indicative of such degree of freedom.

For example, the observation device(s) 110 can have a fairly wide angle association gate appropriate for the specific measurement errors, thus "imperfect angle" response emissions (e.g., creating the synthetic track) could be accepted and not recognized as unusual. If a time gap (e.g., between response emissions) is large compared to drop track criteria, additional response emissions could be included with proper timing but have an imperfect angle. Unless the individual travel paths of the platforms 102A-G are designed to mimic the proper cross range rate (of the synthetic track 108), there can be some error in the apparent cross range position. However, if these imperfect angles fell within the association gates of the observation device(s) 110 they could be accepted by the observation device(s) 110.

Additionally, and/or alternatively, over a certain time window, additional response emissions can be generated and accepted by the observation device(s) 110, unless specific novel logic (described below with respect to FIG. 8) was implemented. This time window can be designed to fall within the anticipated angle gate of the observation device(s) 110 (e.g., this can be approximately or exactly known and/or can be estimated given the beamwidth and SNR) with down-range time adjustments accounting for the differing trajectory between any individual platform 102A-G and the synthetic track 108. The time window could be viewed, for example, as a method to counter imperfect angular positioning of the first platform 102A. In some implementations, the platforms 102A-G can know its own effective radiated power, and thus, SNR estimation associated with observation device(s) 110 can be accomplished utilizing a priori/told-in positional information or localization techniques, such as TDOA measurements, from the platform 102A-G themselves.

The number of components (e.g., platforms 102A-G, emissions 126A-G, synthetic track 108) shown in FIGS. 1-6 are not intended to be limiting. The systems and methods of the present disclosure can include more, less, and/or different components than shown in FIGS. 1-6 without deviating from the scope of the present disclosure. For example, more than one synthetic track can be created by one or more of the platforms 102A-G.

Figure 7:
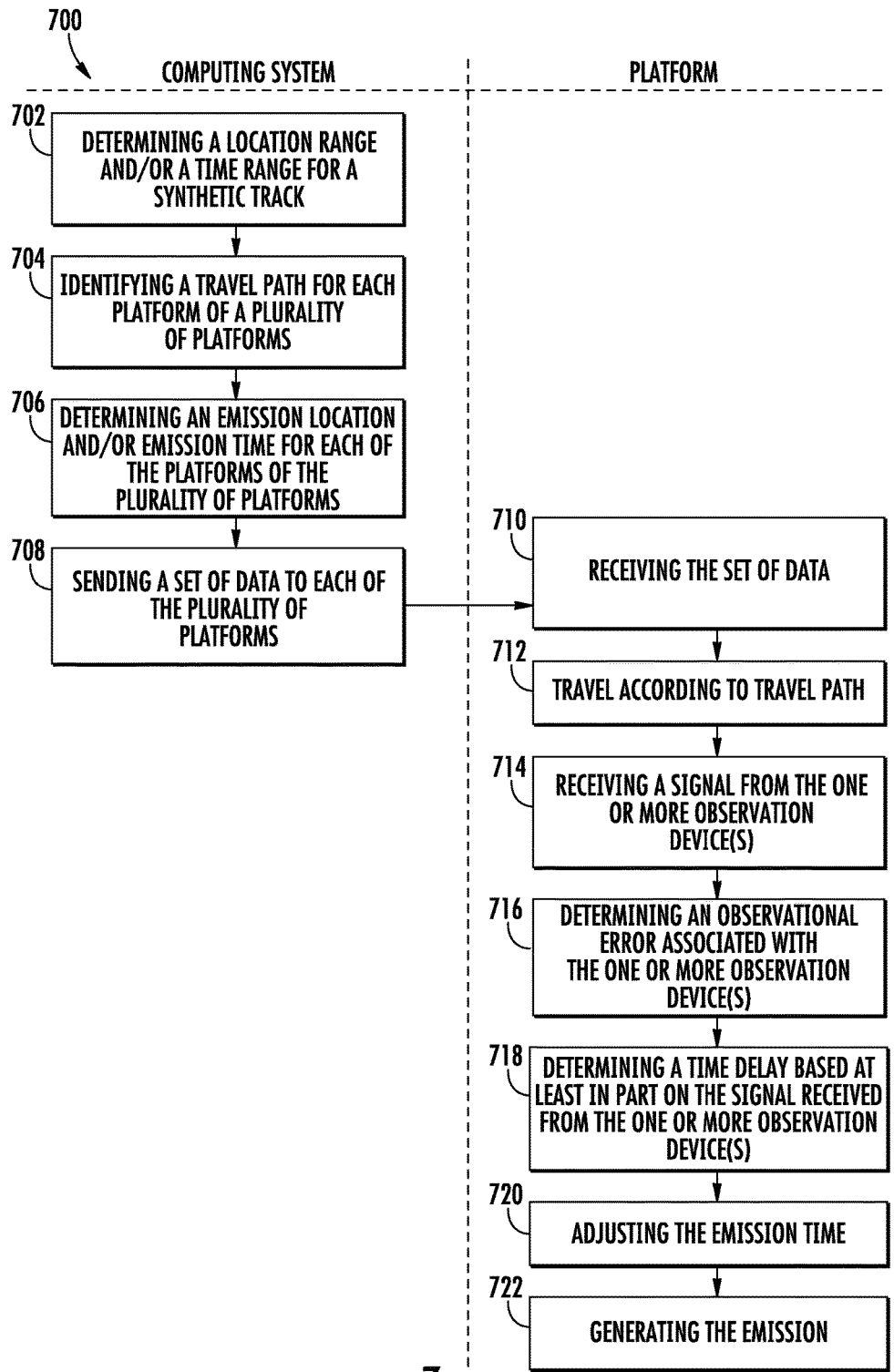
FIG. 7 depicts a flow diagram of an example method for providing a synthetic track to one or more observation devices according to example embodiments of the present disclosure.

FIG. 7 depicts a flow diagram of an example method 700 for providing a synthetic track to one or more observation devices according to example embodiments of the present disclosure. FIG. 7 can be implemented by one or more computing device(s) (e.g., the computing device(s) 106 depicted in FIGS. 1 and 9) as well as a plurality of platforms (e.g., the platforms 102A-G depicted in FIGS. 1-6 and 9). One or more step(s) of the method 700 can be performed while one or more (or each) of the platforms 102A-G are deployed. In addition, FIG. 7 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (702), the method 700 can include determining a location range and/or a time range for a synthetic track. For instance, the computing device(s) 106 can determine a location range 116 and/or a time range 118 for a synthetic track 108 to be created by the plurality of platforms 102A-G. In some implementations, this can be based, at least in part, on the position, type, orientation, etc. of the one or more observation device(s) 110. In some implementations, this determination can be based, at least in part, on the travel path (e.g., 202A-G, 302A-G, 402A-G) for each platform 102A-G. As further described herein, the synthetic track 108 can be a false object travel path that is observable by the one or more observation device(s) 110. The synthetic track 108 can create angular deception to mislead the observation device(s) 110. For example, a first angle 112 associated with the synthetic track 108 can be different than a plurality of second angles (e.g., 404A-B) associated with one or more travel paths (e.g., 402A-G) of the plurality of platforms 102A-G.

At (704), the method 700 can include identifying a travel path for each platform of a plurality of platforms. For instance, the computing device(s) 106 can identify a travel path (e.g., 202A-G, 302A-G, 402A-G) for each platform 102A-G of the plurality of platforms 102A-G. This can be done while one or more of the plurality of platforms 102A-G are deployed (e.g., a swarm of airborne platforms) and/or before one or more of the plurality of platforms 102A-G are deployed. In some implementations, one or more platform(s) 102A-G of the plurality of platforms 102A-G can be associated with one or more travel path(s) (e.g., 202A-G) that are static, such that the respective platform remains generally at a single location. In some implementations, one or more platform(s) 102A-G of the plurality of platforms 102A-G can be associated with one or more travel path(s) (e.g., 302A-G) that include a segment that is in a generally parallel direction relative to the travel paths (e.g., 302A-G) of one or more other platform(s) 102A-G of the plurality of platforms 102A-G. In some implementations, one or more platform(s) 102A-G of the plurality of platforms 102A-G can be associated with one or more travel path(s) (e.g., 402A-G) that include a segment that is in a generally arbitrary direction relative to one or more travel path(s) (e.g., 402A-G) of one or more other platform(s) 102A-G of the plurality of platforms 102A-G.

At (706), the method 700 can include determining an emission location and/or emission time for each of the platforms of the plurality of platforms. For instance, the computing device(s) 106 can determine an emission location 120A-G and/or an emission time 122A-G for each of the platforms 102A-G of the plurality of platforms 102A-G based, at least in part, on the location range 116 and/or the time range 118. The emission location 120A-G can be indicative of a location at which the respective platform 102A-G is to generate an emission 126A-G. The emission time 122A-G can be indicative of a time at which the respective platform 102A-G is to generate the emission 126A-G. In some implementations, the emission time 122A-G can be separated by fixed time intervals.

At (708), the method 700 can include sending a set of data to each of the plurality of platforms. For instance, the computing device(s) 106 can send a set of data 128A-G to each of the plurality of platforms 102A-G. Each respective set of data 128A-G can indicate the emission location 120A-G and/or the emission time 122A-G at which the respective platform 102A-G is to generate the emission 126A-G to create the synthetic track 108. In this way, the computing device(s) 106 can coordinate the platforms 102A-G such that the plurality of platforms 102A-G are to generate the emissions 126A-G in a sequence based, at least in part, on the emission locations 120A-G and/or the emission times 122A-G to create the synthetic track 108 within the location range 116 and/or the time range 118. The set of data 128A-G can also, and/or alternatively, include a travel path for the platform 102A-G to follow. At (710), the method 700 can include receiving the set of data. For instance, each platform 102A-G can receive the set of data 128A-G indicating the emission location 120A-G, the emission time 122A-G, and/or a travel path at which the platform 102A-G is to generate the emission 126A-G. The platforms 102A-G can receive the sets of data 128A-G while airborne and/or while grounded (e.g., before deployment). As described herein, each platform 102A-G of the plurality of platforms 102A-G can be physically separated from each of the other platforms 102A-G of the plurality of platforms 102A-G.

At (712), platforms 102A-G can travel according to a prescribed flight path. In some implementations, the flight path can allow the platforms 102A-G to be properly positioned to make an emission 126A_G at the emission location 120A-G and/or the emission time 122A-G.

In some implementations, at (714), the method 700 can include receiving a signal from the one or more observation devices. For instance, the platforms 102A-G can receive one or more signals 502A-C from the one or more observation device(s) 110. As described herein, the signal(s) 502A-C can be encoded to induce a response from the platform(s) 102A-C to facilitate the monitoring of such platforms by the observation device(s) 110.

In some implementations, at (716), the method 700 can include determining an observational error associated with the one or more observation devices. For instance, the platforms 102A-G can determine an observational error 602 associated with the one or more observation device(s) 110 based, at least in part, on the one or more signal(s) 502A-C received from the one or more observation device(s) 110. By way of example, the first platform 102A can determine the observational error 602 based, at least in part, on the transmitting power, the wavelength, the beam width, other characteristics, etc. associated with the signal 502A.

In some implementations, at (718), the method 700 can include determining a time delay based, at least in part, on the signal received from the one or more observation device(s). For instance, the platforms 102 can determine a time delay (e.g., 506A) based, at least in part, on the signal (e.g., 502A) received from the one or more observation device(s) 110. As described above, the time delay 506A can include the time necessary for the first emission 126A to appear as if it was generated from a position (e.g., $p_1$) within the location range 116. In some implementations, the time delay (e.g., 506A) can be based, at least in part, on the observational error 602. For example, the time delay 506A can be indicative of a range 604 at which the emission 126A can be generated. In this way, the platforms 102A-G can leverage the observational error 602 of the observation device(s) 110 such that the synthetic track is less likely to be rejected by the observation device(s) 110, as described above.

In some implementations, at (720), the method 700 can include adjusting the emission time. For instance, the platforms 102A-G can adjust the emission time 122A-G (and/or the emission location 120A-G) based, at least in part, on the time delay (e.g., 506A), such that the emission 126A-G is generated at the adjusted emission time (e.g., 508A) to create the appearance that at least a portion of the synthetic track 108 is within the location range 116. One of more of the plurality of platform(s) 102A-G can delay the emission time (e.g., 508A) at which the platform 102A-G is to generate the emission 126A-G, such that the synthetic track 108 is created at (e.g. appears to be created at) the location range 116.

At (722), the method 700 can include generating the emission. For instance, each platform 102A-G can generate an emission 126A-G at the emission time 122A-G (and/or emission location 120A-G) such that at least a portion of a synthetic track 108 is created by the emission 126A-G of the platform 102A-G within a location range 116 (and/or the time range 118). As described herein, the synthetic track 108 can be observable by one or more observation device(s) 110. In some implementations, the emissions 126A-G are to be generated by the plurality of platforms 102A-G in response to the plurality of platforms 102A-G receiving one or more signals 502A-C from one or more observation device(s) 110, in accordance with (714)-(720) (e.g. at an adjusted emission time). In some implementations, the emissions 126A-G are not generated in response to the plurality of platforms 102A-G receiving one or more signals 502A-C from the one or more observation device(s) 110.

Figure 8:
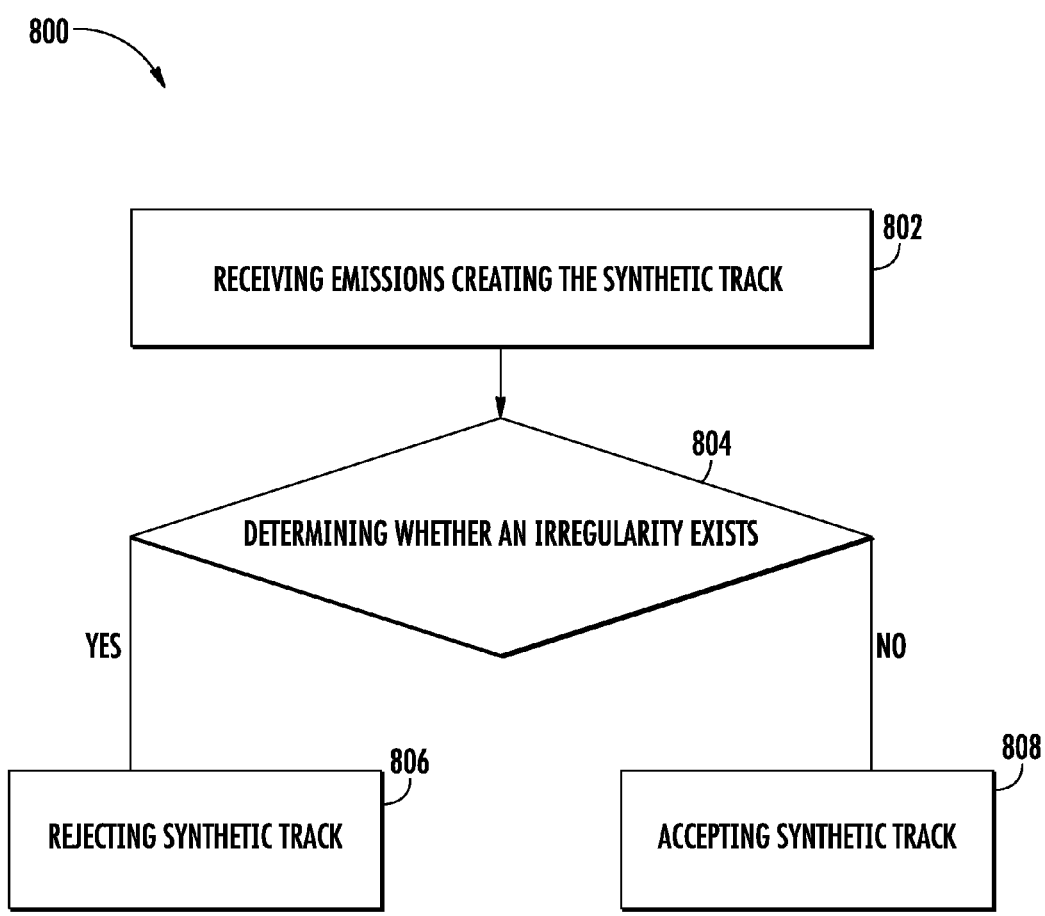
FIG. 8 depicts a flow diagram of an example method for identifying a synthetic track according to example embodiments of the present disclosure.

FIG. 8 depicts a flow diagram of an example method 800 for identifying a synthetic track according to example embodiments of the present disclosure. FIG. 8 can be implemented by one or more computing device(s), such as the computing device(s) 114 of the observation device(s) 110, depicted in FIGS. 1 and 9. One or more step(s) of the method 800 can be performed while one or more (or each) of the platforms 102A-G are deployed (e.g., travelling, underwater, airborne). In addition, FIG. 8 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (802), the method 800 can include receiving emissions creating a synthetic track. For instance, the computing device(s) 114 of the observation device(s) 110 can receive, detect, observe, etc. the emissions 126A-G intended to create the synthetic track 108 from one more platforms 102A-G. The emissions can be generated in an emission sequence (as described herein) and can be generated to create a synthetic track 108 indicative of a false object travel path. The track 108 can aim to create an object travel path. The synthetic track 108 can include one or more bearing angle(s) that create angular deception intending to mislead (e.g., the observation device 110) as to the actual locations and/or travel paths of the platforms 102A-G. The computing device(s) 114 can include a receiver that can be configured to receive, detect, observe, etc. the emissions 126A-G. The computing device(s) 114 can determine if the emissions 126A-G meet one or more initial association gates of the observation device(s) 110.

At (804), the method 800 can include whether an irregularity exists. For instance, the computing device(s) 114 of the observation device(s) 110 can determine whether an irregularity associated with the synthetic track 108 exists based, at least in part, on one or more of the emissions 126A-G. For instance, the computing device(s) 114 can examine the emissions 126A-G to determine if one or more short term angle deviations exist in the synthetic track 108. A short term deviation can be a deviation in the apparent motion created by a track within a particular distance and/or percentage (e.g., 10%) of the track. The short term angle deviations can be indicative of at least one of a short term angle slow down (e.g., an apparent slowdown in motion speed within the particular distance and/or percentage of the track) and/or a short angle speed up (e.g., an apparent increase in motion speed within the particular distance and/or percentage of the track) with respect to the synthetic track 108. The deviation can be that which is different than an expected and/or regular motion associated with an aerial platform (e.g., one without short term speed ups and/or slowdowns). By way of example, the apparent motion of the track 108 can indicate that an object traveling according to the track would be changing speeds (e.g., 58 mph to 60 mph to 62 mph to 59 mph) within a relatively short term (e.g., a percentage of the synthetic track length), that is irregular from an expect motion and/or track associated with a platform. This can occur, for instance, when one or more platforms 102A-G generate emissions within a range (e.g., 604)—creating a synthetic track 108 that can include short term angle deviations. This examination can occur before and/or after the computing device(s) 114 determine if the emissions 126A-G meet one or more initial association gates of the observation device(s) 110. In the event that a number of short term angle deviations associated with the synthetic track 108 are determined to exist above a threshold level of deviations, the computing device(s) 114 can determine that an irregularity associated with the synthetic track 108 exists. The threshold level can be indicative of a number of deviations, an intensity of deviations, etc. In some cases, the irregularity associated with the synthetic track can include at least one of a Doppler error and a location error, as further described below.

At (806), the method 800 can include rejecting the synthetic track. For instance, the computing device(s) 114 of the observation device(s) 110 can reject the synthetic track 108 as an actual object travel path in the event that an irregularity associated with the synthetic track 108 exists. Rejecting the synthetic track 108 can include disregarding further observation of the synthetic track 108 in one or more directions (e.g., the direction of the emissions sequence). Additionally, and/or alternatively, at (808), the method 800 can include accepting the synthetic track. For instance, the computing device(s) 114 of the observation device(s) 110 can accept the synthetic track 108 in the event that a substantial irregularity associated with the synthetic track 108 does not exist.

In the event that the computing device(s) 114 of the observation device(s) 110 are networked, additional consistency checks between observations from the various observation devices can be made to recognize that the synthetic tracks do not represent physical vehicle paths.

In the case of static non-responsive emitters, as depicted in FIG. 2, the angle and TDOA data from all of the observation device(s) 110, independent of aspect angle, should be consistent. However, observation device(s) 110 with different aspect angles would also observe identical frequencies since there is no relative motion; this observation can be inconsistent with the synthetic track 108 which should have produced a Doppler frequency proportional to the synthetic track velocity and cosine on angle between the track velocity vector and any particular observation device 110. For low synthetic track velocities and/or observation device(s) 110 dispersed in a small angular region, especially perpendicular to the synthetic track 108, the ideal synthetic track Doppler effect can be very small and may be buried in observation device noise. The same logic can apply to the case of the parallel travel paths shown in FIG. 3. In the case of arbitrary paths per FIG. 4, the result can be similar even if the various emitters platforms had provided a frequency offset correction designed to counteract the natural Doppler associated with the emitter's motion because the ideal Doppler offset correction applies only on one line of bearing. Accordingly, the observation device(s) 110, can determine whether a Doppler error irregularity exists.

In the case of networked observers attempting to recognize responsive emitters per FIG. 5, the construct can be different if the emitter platforms 102A-G had chosen to use non-zero delays (d1, d2, . . . $d_n$). The recognition techniques described above can be based, at least in part, on a comparison of attributes developed over a series of emissions, while this responsive recognition technique can be more oriented toward recognition on each emission. In some implementations, networked observation device(s) 110 can be presumed to have the capability of knowing details, such as waveform and timing, of each other's emissions which elicit the responsive emissions. When non-zero delays are used, the apparent angular location of the any particular emitter response may not match among observers. The angular mismatch by itself may not, generally, be sufficient to recognize the technique, and may lead to the incorrect conclusion that the responses were created by a multitude of entities at different locations since most correlation analyses may discard results from widely different apparent angles/locations.

In this case, however, TDOA can show a discrepancy which can be detected by the observation device(s) 110. For instance, the computing device(s) 114 of the observation device(s) 110 can determined a tentative responsive emitter platform location by, for instance, estimating the location of the responsive emitter platform 102A-G by moving outward from the original observer emitter platform 102A-G along the observed radial. The computing device(s) 114 can compute the ideal emission travel time from the original observer emitter to the tentative position and add the travel time from the tentative responsive emitter location back to any of the other observer. The computing device(s) 114 can determine that the computed travel time and the measured travel time do not match.

Although angular and time travel mismatches may normally be attributed to the natural consequence of observing more than one object, analysis of the lines of bearing and time delay produces a unique solution yielding both the true location and the responsive emitter platform's time delay value. The analysis can be based, at least in part, on the fact that distance D(oe,re) from the observer emitter (e.g., observation device 110 sending a signal) and the responsive emitter platform (e.g., a platform 102A-G emitting a response) is proportional to the sine of the observed angle A(oe,re) between the observer emitter and the responsive emitter. Similarly, the distance D(re,po) from the responsive emitter and any other passive observer can be proportional to the observed angle A(re,po) between the responsive emitter and that observer. The observed time difference between emission receipts can, thus, be equal D(oe,re)–D(re,po), divided by the speed of propagation. The distance from the observer emitter to the responsive emitter can then be [D(re,po)–D(oe,re)]/[{sin(A(re,po))/sin(A(oe,re))}–1]. The responsive emitter delay can then be readily calculated. Accordingly, the observation device(s) 110, can determine whether a location error irregularity exists. This technique may be computationally intensive since it may be exercised on each emission for many observers; results which do not yield results within the estimated observation errors, or results with responsive emitter negative time delays can be ignored as they may not be realizable via this technique.

Figure 9:
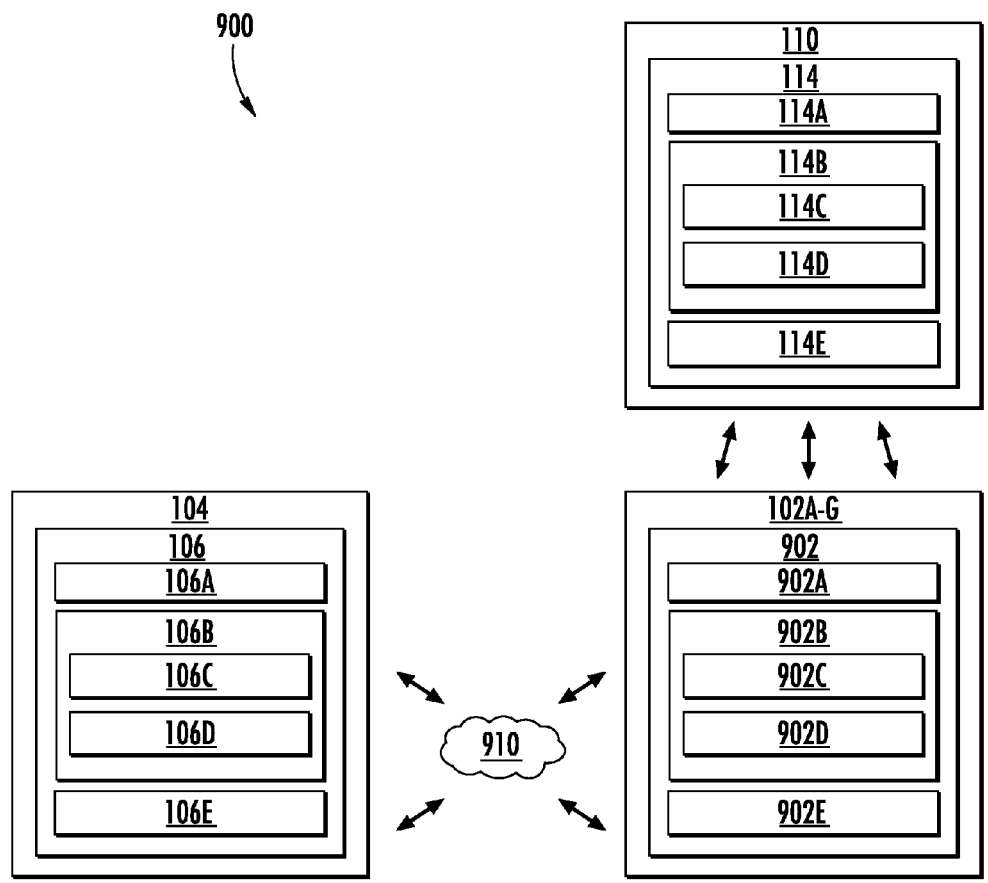
FIG. 9 depicts an example system according to example embodiments of the present disclosure.

FIG. 9 depicts an example system 900 according to example embodiments of the present disclosure. The system 900 can include the computing system 104, the platforms 102A-G, which can be configured to communicate via the network 910, such as, a very high frequency (VHF) network, high frequency (HF) network, SATCOM network, WiFi network, and/or any other suitable communication network. The platforms 102A-G can be located at a remote location that is separated and remote from the computing system 104. For instance, the computing system 104 can be associated with a ground-based operation and/or command center and the platforms 102A-G can be deployed (e.g., airborne, travelling in water, underwater). In some implementations, the system 900 can include the observation device(s) 110.

The computing system 104 can include one or more computing device(s) 106. The computing device(s) 106 can include one or more processor(s) 106A and one or more memory device(s) 106B. The one or more processor(s) 106A can include any suitable processing device, such as a microprocessor, microcontroller, integrated circuit, logic device, and/or other suitable processing device. The one or more memory device(s) 106B can include one or more computer-readable media, including, but not limited to, non-transitory computer-readable media, RAM, ROM, hard drives, flash drives, and/or other memory devices.

The one or more memory device(s) 106B can store information accessible by the one or more processor(s) 106A, including computer-readable instructions 106C that can be executed by the one or more processor(s) 106A. The instructions 106C can be any set of instructions that when executed by the one or more processor(s) 106A, cause the one or more processor(s) 106A to perform operations. In some embodiments, the instructions 106C can be executed by the one or more processor(s) 106A to cause the one or more processor(s) 106A to perform operations, such as any of the operations and functions for which the computing system 104 and/or the computing device(s) 106 are configured, the operations for providing a synthetic track to one or more observation device(s) (e.g., method 700), as described herein, and/or any other operations or functions of the one or more computing device(s) 106. The instructions 106C can be software written in any suitable programming language or can be implemented in hardware. Additionally, and/or alternatively, the instructions 106C can be executed in logically and/or virtually separate threads on processor(s) 106A. The memory device(s) 106B can further store data 106D that can be accessed by the processors 106A. For example, the data 106D can include data and/or information associated with the location range 116, the time range 118, the emission locations 120A-G, the emission times 122A-G, the sets of data 128A-G, the travel paths of the platforms 102A-G, data and/or information associated with the platforms 102A-G, data and/or information associated with the observation device(s) 110, and/or any other data and/or information described herein.

The computing device(s) 106 can also include a communication interface 106E used to communicate, for example, with the other components of system 900 (e.g., via network 910). The communication interface 106E can include any suitable components for interfacing with one or more network(s), including for example, transmitters, receivers, ports, controllers, antennas, and/or other suitable components.

The platforms 102A-G can include one or more computing device(s) 902. The computing device(s) 902 can include one or more processor(s) 902A and one or more memory device(s) 902B. The one or more processor(s) 902A can include any suitable processing device, such as a microprocessor, microcontroller, integrated circuit, logic device, and/or other suitable processing device. The one or more memory device(s) 902B can include one or more computer-readable media, including, but not limited to, non-transitory computer-readable media, RAM, ROM, hard drives, flash drives, and/or other memory devices.

The one or more memory device(s) 902B can store information accessible by the one or more processor(s) 902A, including computer-readable instructions 902C that can be executed by the one or more processor(s) 902A. The instructions 902C can be any set of instructions that when executed by the one or more processor(s) 902A, cause the one or more processor(s) 902A to perform operations. In some embodiments, the instructions 902C can be executed by the one or more processor(s) 902A to cause the one or more processor(s) 902A to perform operations, such as any of the operations and functions for which the platforms 102A-G and/or the computing device(s) 902 are configured, the operations for providing a synthetic track to one or more observation device(s) (e.g., method 700), as described herein, and/or any other operations or functions of the platforms 102A-G. The instructions 902C can be software written in any suitable programming language or can be implemented in hardware. Additionally, and/or alternatively, the instructions 902C can be executed in logically and/or virtually separate threads on processor(s) 902A. The memory device(s) 902B can further store data 902D that can be accessed by the processors 902A. For example, the data 902D can include data and/or information associated with the location range 116, the time range 118, the emission locations 120A-G, the emission times 122A-G, the sets of data 128A-G, the travel paths of the platforms 102A-G, data and/or information associated with the computing system 104, data and/or information associated with the platforms 102A-G, data and/or information associated with the observation device(s) 110, and/or any other data and/or information described herein.

The computing device(s) 902 can also include a communication interface 902E used to communicate, for example, with the other components of system 900. For example, the communication interface 902E can be used to communicate with the computing device(s) 106 via the network(s) 910. Additionally, and/or alternatively, the communication interface 902E can be configured to generate the emissions 126A-G. The communication interface 902E can include any suitable components for interfacing with the one or more network(s) 910 and/or any suitable components for generating the emissions 126A-G, including for example, transmitters, receivers, ports, controllers, antennas, and/or other suitable components.

The observation device(s) 110 can include one or more computing device(s) 114. The computing device(s) 114 can include one or more processor(s) 114A and one or more memory device(s) 114B. The one or more processor(s) 114A can include any suitable processing device, such as a microprocessor, microcontroller, integrated circuit, logic device, and/or other suitable processing device. The one or more memory device(s) 114B can include one or more computer-readable media, including, but not limited to, non-transitory computer-readable media, RAM, ROM, hard drives, flash drives, and/or other memory devices.

The one or more memory device(s) 114B can store information accessible by the one or more processor(s) 114A, including computer-readable instructions 114C that can be executed by the one or more processor(s) 114A. The instructions 114C can be any set of instructions that when executed by the one or more processor(s) 114A, cause the one or more processor(s) 114A to perform operations. In some embodiments, the instructions 114C can be executed by the one or more processor(s) 114A to cause the one or more processor(s) 114A to perform operations, such as any of the operations and functions for which the observation device(s) 110 and/or the computing device(s) 114 are configured, the operations for identifying a synthetic track (e.g., method 800), as described herein, and/or any other operations or functions of the one or more observation device(s) 110. The instructions 114C can be software written in any suitable programming language or can be implemented in hardware. Additionally, and/or alternatively, the instructions 114C can be executed in logically and/or virtually separate threads on processor(s) 114A. The memory device(s) 114B can further store data 114D that can be accessed by the processors 114A. For example, the data 114D can include data and/or information associated with the emissions 126A-G, data associated with the synthetic track 108 (e.g., irregularities, deviations), data and/or information associated with the platforms 102A-G, and/or any other data and/or information described herein.

The computing device(s) 114 can also include a communication interface 114E. The communication interface 114E can be used to send signals 502A-C to the platforms 102A-G and/or receive, detect, monitor, observe, etc. emissions 126A-G. The communication interface 114E can include any suitable components for sending and receiving signals and/or emissions, including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of identifying a synthetic track, comprising:
   receiving, by one or more computing devices, a plurality of emissions from one or more platforms,
      wherein the emissions are generated in an emission sequence and are generated to create a track indicative of an object travel path;
   determining, by the one or more computing devices, whether an irregularity associated with the track exists based at least in part on one or more of the emissions, including determining, by the one or more computing devices, whether one or more short angle deviations exist in the track; and
   rejecting, by the one or more computing devices, the track as an actual object travel path when it is determined that the irregularity associated with the track exists.

2. The computer-implemented method of claim 1, wherein the one or more short angle deviations are indicative of at least one of a short term angle slow down and a short term angle speed up with respect to the one or more platforms generating the emissions to create the track.

3. The computer-implemented method of claim 1, wherein the track includes one or more bearing angles that create angular deception intending to mislead as to travel paths of the one or more platforms.

4. The computer-implemented method of claim 1, further comprising:
   sending, by the one or more computing devices, one or more signals to the one or more platforms, wherein the signals are encoded to induce a response from the platforms, and wherein the emissions are in response to the one or more signals.

5. The computer-implemented method of claim 1, wherein the emissions are not generated in response to the plurality of platforms receiving one or more signals.

6. The computer-implemented method of claim 1, wherein the platforms are airborne aerial platforms.

7. The computer-implemented method of claim 1, wherein each platform of the plurality of platforms is physically separated from each of the other platforms of the plurality of platforms.

8. The computer-implemented method of claim 1, wherein one or more platforms of the plurality of platforms are associated with one or more travel paths that comprise a segment that is in a generally parallel direction relative to one or more travel paths of one or more other platforms of the plurality of platforms.

9. The computer-implemented method of claim 1, wherein one or more platforms of the plurality of platforms are associated with one or more travel paths that comprise a segment that is in a generally arbitrary direction relative to one or more travel paths of one or more other platforms of the plurality of platforms.

10. The computer-implemented method of claim 1, wherein one or more platforms of the plurality of platforms are associated with one or more travel paths such that the respective platform remains generally at a single location.

11. A computing system for identifying a synthetic track, the system comprising one or more processors and one or more memory devices, the one or more memory devices storing instructions that when executed by the one or more processors cause the one or more processors to:
receive a plurality of emissions from a plurality of platforms, wherein the plurality of emissions are generated to create a track,
wherein the track aims to create an object travel path, and wherein a first angle associated with the track is different than a plurality of second angles associated with the travel paths of the plurality of aerial platforms;
determine whether an irregularity associated with the track exists based at least in part on one or more of the emissions, the irregularity including one or more short angle deviations in the track; and
reject the track as an actual object travel path when it is determined that the irregularity associated with the track exists.

12. The system of claim 11, wherein to determine whether an irregularity associated with the track exists based at least in part on one or more of the emissions, the processors are caused to:
determine whether one or more deviations exist in the track, wherein the one or more deviations are indicative of at least one of a slowdown and a speed up with respect to the one or more platforms generating the emissions to create the track.

13. The system of claim 11, wherein each platform of the plurality of platforms is an aerial platform, and wherein each platform of the plurality of platforms is physically separated from each of the other platforms of the plurality of platforms.

14. The system of claim 11, wherein the emissions are not generated in response to the plurality of aerial platforms receiving one or more signals from one or more observation devices.

* * * * *